(12) United States Patent
Mitchell

(10) Patent No.: US 11,831,645 B1
(45) Date of Patent: Nov. 28, 2023

(54) DYNAMICALLY RESTRICTING SOCIAL MEDIA ACCESS

(71) Applicant: Intuit Inc., Mountain View, CA (US)

(72) Inventor: Michael William Mitchell, Santa Cruz, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/129,529

(22) Filed: Mar. 31, 2023

(51) Int. Cl.
*G06F 21/62* (2013.01)
*H04L 9/40* (2022.01)
*G06Q 50/00* (2012.01)

(52) U.S. Cl.
CPC ............ *H04L 63/10* (2013.01); *G06Q 50/01* (2013.01)

(58) Field of Classification Search
CPC ................................ H04L 63/10; G06Q 50/01
USPC ............................................................. 726/26
See application file for complete search history.

(56) References Cited

U.S. PATENT DOCUMENTS

| | | | |
|---|---|---|---|
| 5,280,581 A * | 1/1994 | Bathrick | G06F 21/313 |
| | | | 709/228 |
| 8,311,949 B1 * | 11/2012 | Singer | G06Q 10/103 |
| | | | 705/319 |
| 9,426,231 B2 | 8/2016 | Yoshikawa et al. | |
| 9,674,136 B2 | 6/2017 | Blue et al. | |
| 11,290,412 B2 | 3/2022 | Blue et al. | |
| 2009/0171964 A1 | 7/2009 | Eberstadt et al. | |
| 2011/0191838 A1 * | 8/2011 | Yanagihara | G06F 21/00 |
| | | | 726/26 |
| 2016/0148264 A1 | 5/2016 | Winstanley et al. | |
| 2017/0046390 A1 | 2/2017 | Jain et al. | |
| 2020/0279337 A1 * | 9/2020 | Smith | G06F 16/9024 |

* cited by examiner

*Primary Examiner* — Tu T Nguyen
(74) *Attorney, Agent, or Firm* — Paradice & Li LLP

(57) ABSTRACT

This disclosure relates to restricting access in a social network. The social network stores profile information for each of a plurality of users of the social network in a database. The social network receives, from a first user of the social network, a request to invite a second user to establish a connection with the first user. The social network transmits, to the first user, one or more questions pertaining to the profile information of the second user. The social network receives, from the first user, one or more answers responsive to the one or more questions. The social network determines whether each of the answers is correct based on the stored profile information of the second user. The social network transmits, to the second user, an invitation to establish the connection with the first user when at least a number of the answers are correct.

20 Claims, 10 Drawing Sheets

DYNAMICALLY RESTRICTING SOCIAL MEDIA ACCESS

TECHNICAL FIELD

This disclosure generally relates to social networks, and more specifically, to restricting access to user accounts associated with social networks.

DESCRIPTION OF RELATED ART

A social network allows its users to interact with each other via a corresponding social network website. The social network typically receives demographic information, attributes, personal interests, and the like from each user to create and store a user profile for the respective user in a database associated with the social network. The social network may store relationships and/or connections between various users of the social network, and may provide a forum (e.g., wall posts, comments, picture and video sharing, event organization, messaging, games, and advertising, among other examples) to facilitate social interaction between the users.

The social network may provide content, messages, advertising, and other services to users that are registered with the social network. A user can execute a browser or software application (an "App") residing on a computing device (e.g., a computer, tablet, or smartphone, among other examples) to access the social network, to view the user's profile page, to view other users' profile pages, and to publish posts (e.g., text, images, or videos, among other examples) that can be shared with or viewed by other users of the social network.

As social networks become more ubiquitous and attract increasing numbers of users, personal privacy on these social networks may decrease. As such, there is a need to increase the level of privacy on social networks.

SUMMARY

This Summary is provided to introduce in a simplified form a selection of subjects that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for restricting access in a social network. The method can be performed by one or more processors associated with the social network, and includes storing profile information for each of a plurality of users of the social network in a database. The method includes receiving a first transmission over a communications network from a first computing device associated with a first user, the first transmission including a request to invite a second user of the social network to establish a connection with the first user. The method includes transmitting, over the communications network to the first computing device, one or more questions pertaining to the second user. The method includes receiving a second transmission over the communications network from the first computing device, the second transmission including one or more answers responsive to the one or more questions. The method includes determining whether each of the one or more answers is correct based on the stored profile information of the second user. The method includes transmitting, over the communications network to a second computing device associated with the second user, an invitation to establish the connection with the first user when at least a first number of the one or more answers are correct. In some aspects, the social network transmits the invitation to establish the connection to the second computing device only if all the answers to the one or more questions are correct.

In some instances, the profile information may include one or more of educational history of the second user, an alma mater of the second user, work history of the second user, current or former employers of the second user, current or former friends of the second user, a spouse of the second user, one or more children of the second user, a current residence of the second user, the city in which the second user was born, a hometown of the second user, a favorite sport of the second user, a hobby of the second user, a special talent of the second user, or one or more characteristics, personal attributes, or facts pertaining to the second user that are uniquely known to the first user. In some aspects, the social network can present the one or more questions to the first user via a user interface associated with the first computing device. The user interface may include at least one of a display screen, an audio interface, a virtual reality headset, an augmented reality headset, a digital assistant, a haptic interface, a motion-detection interface, a sensor interface, a keyboard, a trackpad, a trackball, or a mouse.

In some implementations, the method also includes receiving an acceptance of the invitation by the second user, and establishing the connection between the first and second users based on the acceptance of the invitation. In some instances, the method also includes granting the first user a level of access to content posted on the social network by the second user after establishing the connection between the first and second users. In some aspects, the level of access may be based on the number of correct answers responsive to the one or more questions.

In other implementations, the method also includes transmitting, over the communications network to the second computing device associated with the second user, an indication that the first user's request to invite the second user is rejected when less than the first number of the one or more answers are correct. In some instances, the method also includes transmitting, over the communications network to the first computing device, one or more additional questions pertaining to the second user. The method also includes receiving a third transmission over the communications network from the first computing device, the third transmission including one or more additional answers responsive to the one or more additional questions, and determining whether each of the one or more additional answers is correct based on the stored profile information of the second user. The method also includes transmitting, over the communications network to the second computing device associated with the second user, the invitation to establish the connection with the first user when at least a second number of the one or more additional answers are correct. In some instances, the second number may be greater than the first number. In other instances, the second number may be less than the first number. In some other instances, the second number may be equal to the first number.

In some instances, the method also includes determining whether the request to invite the second user corresponds to a prior search for users of the social network having one or more personal attributes specified by the second user. The method also includes determining that the first user has at least one of the personal attributes specified by the second user and that the second user has indicated a willingness to accept invitations from other users who have the at least one personal attribute, and transmitting, over the communications network to the second computing device associated with the second user, the invitation to establish the connection with the first user in response to the first and second users having the same at least one personal attribute.

Another innovative aspect of the subject matter described in this disclosure can be implemented in a system for restricting access in a social network. In some implementations, the system may include one or more processors and a memory communicatively coupled with the one or more processors. In some instances, the memory stores instructions that, when executed by the one or more processors, causes the system to store profile information for each of a plurality of users of the social network in a database. Execution of the instructions causes the system to receive a first transmission over the communications network from a first computing device associated with a first user, the first transmission including a request to invite a second user of the social network to establish a connection with the first user. Execution of the instructions causes the system to transmit, over the communications network to the first computing device, one or more questions pertaining to the second user. Execution of the instructions causes the system to receive a second transmission over the communications network from the first computing device, the second transmission including one or more answers responsive to the one or more questions. Execution of the instructions causes the system to determine whether each of the one or more answers is correct based on the stored profile information of the second user. Execution of the instructions causes the system to transmit, over the communications network to a second computing device associated with the second user, an invitation to establish the connection with the first user when at least a first number of the one or more answers are correct. In some aspects, the social network transmits the invitation to establish the connection to the second computing device only if all the answers to the one or more questions are correct.

In some instances, the profile information may include one or more of educational history of the second user, an alma mater of the second user, work history of the second user, current or former employers of the second user, current or former friends of the second user, a spouse of the second user, one or more children of the second user, a current residence of the second user, the city in which the second user was born, a hometown of the second user, a favorite sport of the second user, a hobby of the second user, a special talent of the second user, or one or more characteristics, personal attributes, or facts pertaining to the second user that are uniquely known to the first user. In some aspects, the social network may present the one or more questions to the first user via a user interface associated with the first computing device. The user interface may include at least one of a display screen, an audio interface, a virtual reality headset, an augmented reality headset, a digital assistant, a haptic interface, a motion-detection interface, a sensor interface, a keyboard, a trackpad, a trackball, or a mouse.

In some implementations, execution of the instructions may also cause the system to receive an acceptance of the invitation by the second user, and to establish the connection between the first and second users based on the acceptance of the invitation. Execution of the instructions may also cause the system to grant the first user a level of access to content posted on the social network by the second user after establishing the social connection between the first and second users. In some aspects, the level of access may be based on the number of correct answers responsive to the one or more questions.

In other implementations, execution of the instructions also causes the system to transmit, over the communications network to the second computing device associated with the second user, an indication that the first user's request to invite the second user is rejected when less than the first number of the one or more answers are correct. In some instances, execution of the instructions also causes the system to transmit, over the communications network to the first computing device, one or more additional questions pertaining to the second user. Execution of the instructions also causes the system to receive a third transmission over the communications network from the first computing device, the third transmission including one or more additional answers responsive to the one or more additional questions. Execution of the instructions also causes the system to determine whether each of the one or more additional answers is correct based on the stored profile information of the second user. Execution of the instructions also causes the system to transmit, over the communications network to the second computing device associated with the second user, the invitation to establish the connection with the first user when at least a second number of the one or more additional answers are correct. In some instances, the second number may be greater than the first number. In other instances, the second number may be less than the first number. In some other instances, the second number may be equal to the first number.

In some instances, execution of the instructions also causes the system to determine whether the request to invite the second user corresponds to a prior search for users of the social network having one or more personal attributes specified by the second user. Execution of the instructions also causes the system to determine that the first user has at least one of the personal attributes specified by the second user and that the second user has indicated a willingness to accept invitations from other users who have the at least one personal attribute, and to transmit, over the communications network to the second computing device associated with the second user, the invitation to establish the connection with the first user in response to the first and second users having the same at least one personal attribute.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
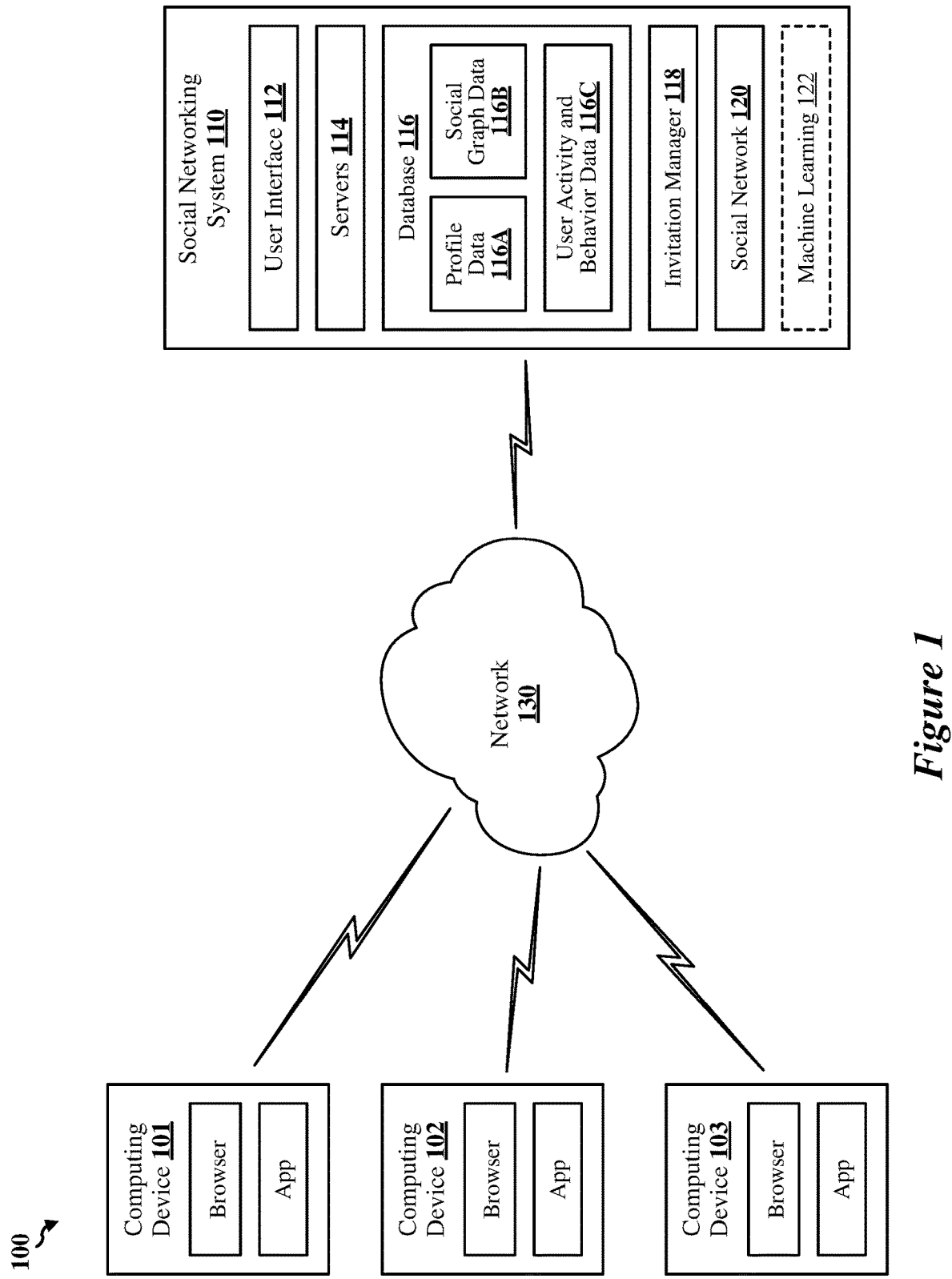
FIG. 1 shows an example network environment associated with a social network, according to some implementations.

Implementations of the subject matter described in this disclosure can be used to promote privacy in a social network by selectively restricting the ability of users of the social network to send unsolicited invitations to connect to other users of the social network. In conventional systems, a user can typically send invitations to connect (or "connection invites") to other users simply by searching for other users or by selecting a "recommended" user connection that appears in the feed, wall, or home page of the respective user. In some instances, the invitee user may not know or may have never heard of the inviter, and therefore may not want to receive such connection invites. That is, although the ease with which new connections can be established may increase the interconnections between users, and thereby increase the number of unique social interactions by the users, some users may prefer to receive connection invites only from people or entities that they know or at least recognize. For example, if a second user does not know or recognize a first user, the second user may prefer to not receive connection invites from the first user, for example, so that the second user does not have to decline or ignore connection invites sent by the first user.

Thus, in accordance with various aspects of the present disclosure, access to a social network can be restricted in a manner that reduces or even eliminates the ability of a user to send invitations to connect to other users with whom the respective user does not know, does not have a relationship, and/or does not have at least a specified number of personal attributes in common with the other users. The specified number of common personal attributes may be selected by the other user or by the social network system. In some implementations, the social network system can restrict the ability of a user of the social network to send connection invites to other users whom the respective user does not know. In some instances, the social network system may allow a first user to send a connection invite to the second user only if the first user is able to correctly answer one or more questions pertaining to the second user. In other instances, the social network system may allow the first user to send a connection invite to the second user only if the first user has some relationship or association with the second user. In some other instances, the social network system may allow the first user to send a connection invite to the second user only if the first and second users have at least a specified number of personal attributes in common with each other.

Aspects of the subject matter disclosed herein are not an abstract idea such as a mental process that can be performed in the human mind, for example, because the human mind is not capable of implementing an online social network that is accessible by users over one or more communications networks (e.g., the Internet). Nor is the human mind capable of transmitting invitations to connect to other users of the social network over one or more communications network. Indeed, the human mind is neither equipped to nor capable of transmitting anything over a communications network— let alone transmitting invitations to connect from one user of a social network to another user of the social network over the communications network. Aspects of the subject matter disclosed herein are not an abstract idea such as a method of organizing human activity because the claims of this patent application do not recite any fundamental economic practice, commercial interaction, legal interaction, or business relations. Moreover, various aspects of the present disclosure provide a technical solution to a technical problem rooted in technology, namely, promoting privacy in a social network by requiring a first user of the social network who wants to establish a connection with a second user of the social network to show that the first user knows at least something informative about the second user.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

Several aspects of electronic payment services will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 associated with a social network, according to some implementations. The network environment 100 is shown to include three computing devices 101-103, a social network system 110, and a communications network 130. As used herein, the first computing device 101 may be associated with a first user registered with the social network system 110, the second computing device 102 may be associated with a second user registered with the social network system 110, and the third computing device 103 may be associated with a third user registered with the social network system 110 (for simplicity, users are not shown in FIG. 1). The computing devices 101-103 can be any suitable wired or wireless computing device that can access and communicate with the social network system 110 over the communications network 130. Although not shown in FIG. 1 for simplicity, each of the computing devices 101-103 includes a user interface through which a respective user can interact with one or more social networks associated with the social network system 110. For example, the user interface of a computing device allows a respective user to view content, messages, services, and other information provided by the social network system 110, and also allows the respective user to post information in one or more of the social networks, to send messages to other users, and to share content with other users, among other examples. In various aspects, the user interface may include at least one of a display screen, an audio interface, a virtual reality headset, an augmented reality headset, a digital assistant, a haptic interface, a motion-detection interface, a sensor interface, a keyboard, a trackpad, a trackball, or a mouse.

In some instances, one or more of the computing devices 101-103 can be a desktop computer, laptop computer, tablet computer, personal digital assistant, cellular telephone, smartphone, electronic book reader, or other suitable device capable of communicating with the social network system 110. Although only three computing devices 101-103 are shown in the example of FIG. 1, in other implementations, any suitable number of computing devices can be connected to the social network system 110 over the communications network 130. In addition, although not shown for simplicity, the network environment 100 may include other computing devices, servers, interfaces, online social networks, or third-party systems.

In some instances, the computing devices 101-103 may include a generic browser through which their respective users can access or login to the social network system 110 and thereafter interact with content and services provided on the social network system 110. In other instances, the computing devices 101-103 may include a software application (an "App") that allows their respective users to access the social network system 110 over the communications network 130. For example, when executed by a processor (not shown for simplicity) of a computing device, the App allows a respective user to login to the social network system 110 and thereafter interact with content and services provided on the social network system 110.

The social network system 110 includes a user interface 112, one or more servers 114, a database 116, an invitation manager 118, and a social network 120. The user interface 112 receives requests from various computing devices, and transmits appropriate responses to the requesting computing devices over the communications network 130. For example, the user interface 112 may receive requests from computing devices 101-103 as Hyper-Text Transfer Protocol (HTTP) requests, Application Program Interface (API) requests, or other web-based requests and, after accepting the HTTP request, may communicate with the computing devices 101-103 using one or more Hyper Text Markup Language (HTML) files responsive to the HTTP request. In some instances, the user interface 112 may, in conjunction with an application logic layer (not shown for simplicity), generate the HTML files as web pages that can be transmitted to the computing devices 101-103 over the communications network 130. The computing devices 101-103 may present the received HTML files as web pages to their respective users, who can interact with the web pages using respective computing devices 101-103.

The servers 114 may include various types of servers such as (but not limited to) a web server, a news server, a file server, an application server, a database server, a proxy server, or any other server suitable for performing functions or processes described herein. Each server 114 may be a unitary server or a distributed server spanning multiple computers or multiple datacenters, and may include hardware, software, or embedded logic components or a combination of two or more such components for carrying out the appropriate functionalities implemented or supported by the server 114. In some instances, each server 114 may include one or more processors (not shown for simplicity) capable of executing scripts or instructions of one or more software programs stored in an associated memory. In addition, or in the alternative, the processors may be or may include any number of Application Specific Integrated Circuits (ASICs), Field Programmable Gate Arrays (FPGAs), or Programmable Logic Devices (PLDs).

In some implementations, the servers 114 may include individual application server modules (not shown for simplicity) that can implement the functionality associated with various services and features of the social network 120. For instance, the ability of an individual entity or organization to establish a presence in a social graph associated with the social network 120, including the ability to establish a customized web page on behalf of the individual entity or organization, and to publish messages or status updates on behalf of the individual entity or organization, may be services implemented in the independent application server modules. Similarly, various applications and/or services made available to users of the social network 120 can be implemented in their own respective application server modules.

The database 116 stores information pertaining to users registered or otherwise associated with the social network 120, information pertaining to connections or links between the users, user-generated content, user posts, sponsored content, advertisements, events, and other information associated with content and services provided by the social network system 110. In some instances, the database 116 can be a relational database capable of manipulating any number of various data sets using relational operators. The database 116 can also use Structured Query Language (SQL) for querying and maintaining the database, and information stored in the database 114 can be arranged in tabular form, either collectively in a feature table or individually within each of the data sets.

The database 116 may include a profile data store 116A, a social graph data store 116B, and a user activity and behavior store 116C. The profile data store 116A may store profile information for users registered with or otherwise associated with the social network 120. In various aspects, the profile data store 116A may also store profile information for one or more individual entities or organizations. In some instances, when a person initially registers to become a user of the social network 120, the person may be prompted to provide personal information and/or personal attributes including (but not limited to) name, age, birthday, gender, educational history, work history, current or former employers, current or former friends, spousal information, children information, current residence, hometown, birthplace, a hobby, a special talent, interests, ideologies, beliefs, affinities, characteristics, or facts pertaining to the person that are uniquely known to one or more other users of the social network 120, among other examples. Similarly, when a representative of an individual entity or organization initially registers the individual entity or organization with the social network 120, the representative may be prompted to provide certain information about the individual entity or organization, which may be stored in the profile data store 116A. In some aspects, the profile information of a respective user may be processed to generate various derived profile data of the respective user. For example, if a user provided information indicating various job titles the user has held with the same company or different companies, and the duration of each job title, this information can be used to infer or derive a user profile attribute indicating the user's overall seniority or experience level within a particular company, industry or specialty.

Once a user is registered with the social network 120, the user may invite other users, or be invited by other users, to establish a connection with the other users in the social network 120. In various aspects, both users must agree to establish the connection between them. For example, a first user of the social network 120 may want to establish a connection with a second user of the social network 120. The first user may use computing device 101 to send an invitation to connect (also referred to herein as a "connection invite") over the communications network 130 to the social network system 110, which in turn may forward the connection invite over the communications network 130 to computing device 102. In response thereto, the computing device 102 presents the connection invite to the second user on a user interface (such as a display screen) associated with computing device 102. In some instances, the second user may accept, decline, or ignore the connection invite from the first user. In other instances, the second user may take some other action such as, for example, providing follow-on questions or new questions for the first user to answer correctly as a prerequisite for the connection invite to be delivered to the first user.

In some implementations, a user may "follow" another user. In contrast to the bi-lateral manner in which a connection is established between users, following another user is typically a unilateral operation that does not require acknowledgement or approval by the other user (the "followed" user). Users that follow ("following" users) other users can receive messages, status updates, or other content provided by the followed user. Similarly, when a user follows an individual entity or organization, the user may receive messages, status updates, or other content provided by the individual entity or organization. In some aspects, messages and status updates published on behalf of a followed individual entity or organization can be presented in the following users' feed, wall, or content stream. The various associations and relationships that users of the social network 120 establish with one another, including connections and followings, can be stored in one or more social graphs.

The social graph data store 116B may store one or more social graphs indicating the relationships, associations, connections, and followings between various users, individual entities, organizations, and other third-party entities associated with the social network 120. In some instances, the social graphs include a plurality of user nodes that are selectively connected to one another by multiple edges, where each user node corresponds to a respective user of the social network 120 and each edge corresponds to a relationship, association, or connection between a pair of users of the social network 120. For example, when a first user and a second user establish a connection between them, the social graph stored in the social graph data store 116B can be updated to include a connection edge between the user nodes associated with the first and second users.

The user activity and behavior store 116C may store information indicating various activities and online behavior of users of the social network 120. For example, as a user interacts with the various applications, services, and content made available on the social network 120, the content viewed, links selected, or other behavior of the user can be monitored to generate information indicating the user's activities and behavior, which may be stored in the user activity and behavior store 116C of the database 116. In some instances, this information may be used to classify the user based on different categories, attributes, interests, beliefs, and so on. For example, if the user frequently searches for job listings, thereby exhibiting behavior indicating that the user is a likely job seeker, then this information can be used to classify the user as a job seeker. The user's classification can be stored as part of the user's profile information, which in turn may allow other users to provide relevant messages, status updates, advertising, and/or other content to the user. In this way, a company can post job openings that are directed to certain users of the social network 120, thereby increasing the likelihood of attracting interested job seekers.

The invitation manager 118 may be used to restrict the ability of users, organizations, and other entities associated with the social network 120 to send unsolicited invitations to other users. In some instances, the invitation manager 118 may allow a first user to send a connection invite to a second user only if the first user knows or has a personal relationship with the second user. In other instances, the invitation manager 118 may allow the first user to send a connection invite to the second user only if the first user has some other relationship or association with the second user. In some other instances, the invitation manager 118 may allow the first user to send a connection invite to the second user only if the first and second users have a certain number of personal attributes in common with each other. In some other instances, the invitation manager 118 can use some other criteria to determine whether or not to allow the first user to send a connection invite to the second user. In some aspects, the second user may select the criteria and/or questions used by the invitation manager 118 to ensure that the second user is likely to know the second user, recognize the first user, or be interested in connecting with the first user. In other aspects, the invitation manager 118 may select the criteria and/or the questions. Additional aspects and operations of the invitation manager 118 are described in more detail with respect to FIG. 3.

The social network 120 may provide a broad range of other applications and services that allow users the opportunity to share and receive information. In some aspects, the social network 120 may provide information that is customized to the interests of the respective users. For example, in some instances, the social network 120 may include a photo sharing application that allows users to upload and share photos with other users. The users may be able to self-organize into groups based on common interests, beliefs, or other personal attributes. In some instances, the social network 120 may host various job listings providing details of job openings with various organizations.

The social network system 110 may allow users to take actions on various types of items or objects including (but not limited to) groups or social networks to which users of the social network 120 belong, events or calendar entries in which users may be interested, computer-based applications available to the users, transactions that allow users to buy or sell goods and services through the social network 120, and interactions with advertisements, among other examples. In some instances, the social network system 110 may allow users to interact with anything capable of being represented in the social network 120 or by an external third-party system (not shown for simplicity).

In some implementations, the social network 120 may be associated with a third-party content provider (not shown for simplicity) that can provide, to various users or groups of users, content such as (but not limited to) movie show times, movie reviews, restaurant reviews, restaurant menus, product information and reviews, recommendations or likes of other users, coupons, discount tickets, or gift certificates, among other examples. The social network 120 may also include user-generated content (such as links and posts) that can enhance a respective user's interactions with the social network 120. For example, a user can transmit a post to the social network 120 from a corresponding computing device, and the social network 120 can publish the post on user walls, user feeds, or other pages accessible by users of the social network 120. In some instances, the social network 120 can publish a post by transmitting the post to computing devices associated with one or more users (or one or more groups of users). Posts may include status updates, textual data, location information, photos, videos, links, music, media, files, tastes, accomplishments, goals, intentions, or desires, among other examples. In some aspects, a third-party can add content to the social network 120 using a newsfeed, stream, or other suitable communication channel.

Although not shown for simplicity, the social network system 110 may include an application programming interface (API) module through which third-party applications can access various services and data provided by the social network 120. For example, a third-party application can use the API to provide a user interface and logic that allows a third-party application to publish content on the social network 120. The third-party applications may be browser-based applications or may be operating system-specific. In some instances, third-party applications may reside and be executed on one or more mobile communication devices (such as a smartphone or tablet computer). In some implementations, the social network system 110 may include a similarity engine (not shown for simplicity) that generates and stores similarity information indicating groups of users having one or more similarities in their respective user profiles and/or personal attributes. For example, the similarity information may identify users who have similar or common work experiences and/or educational backgrounds. For another example, the similarity information may identify users who have similar or common hobbies, preferences, and/or interests. For another example, the similarity information may identify users who have similar or common ideologies, beliefs, and/or affinities. In some aspects, the similarity information may also include user-defined connections between different users and content.

The network 130 provides communication links between the social network system 110 and each of the computing devices 101-103. The network 130 can be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof.

Figure 2:
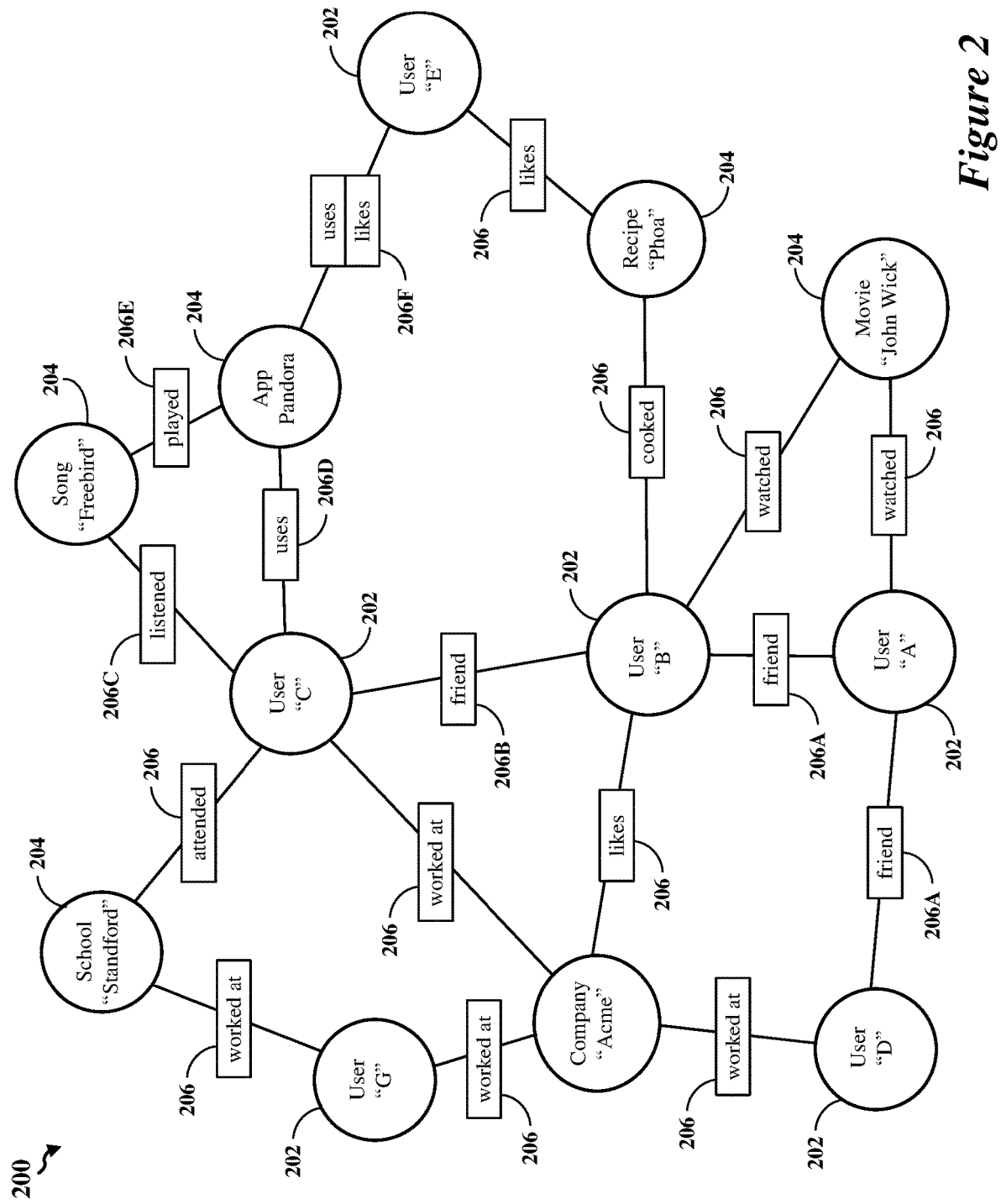
FIG. 2 shows an example social graph, according to some implementations.

FIG. 2 shows an example social graph 200, according to some implementations. The social graph 200 may include a plurality of user nodes 202 and subject nodes 204 that are selectively connected to one another by multiple edges 206. Each user node 202 may be associated with a respective user of the social network 120, and each subject node 204 may be associated with a respective subject of the social network 120. When a new user registers with the social network 120, the social network system 110 may create a user node 202 for the new user, and may store the user node 202 in the social graph data store 116B as part of the social graph 200. In some instances, the user nodes 202, subject nodes 204, and edges 206 of the social graph 200 may be stored as data objects from which one or more searchable indexes of nodes or edges can be created and used to identify connections between users of the social network 120.

A pair of nodes in the social graph 200 may be connected to each other by one or more edges 206. An edge 206 connecting a pair of nodes may represent a relationship between the pair of nodes. In some instances, an edge 206 may indicate one or more data objects or attributes corresponding to the relationship between a pair of nodes. For example, when a first user and a second user establish a connection, the social network system 110 may create an edge 206 connecting a first user node 202 associated with the first user to a second user node 202 associated with the second user, and then store the edge 206 in the social graph data store 116B as part of the social graph 200. In the example of FIG. 2, the social graph 200 includes an edge 206A indicating a friend relationship between the user nodes 202 associated with user A and user B, and includes an edge 206B indicating a friend relationship between the user nodes 202 associated with user B and user C. Other edges 206 of the social graph 200 may indicate other types of connections between users of the social network 120 including, for example, a family relationship, a business or employment relationship, an activity relationship, a "likes" relationship, a "following" relationship, or a subscriber relationship, among other examples.

In some instances, an edge 206 between a user node 202 and a subject node 204 may represent a particular action or activity performed by the user associated with the respective user node 202 in conjunction with the subject associated with the respective subject node 204. For example, a user may "like," "attended," "played," "listened," "cooked," "worked at," or "watched" a subject. For another example, user C may listen to the song "Freebird" using the Pandora App. In response thereto, the social network system 110 may create a "listened" edge 206C between the user node 202 corresponding to user C and the subject node 204 corresponding to the song "Freebird" and may create a "uses" edge 206D between the user node 202 corresponding to user C and the subject node 204 corresponding to the Pandora App to indicate that user C listened to the song and uses the application. In some aspects, the social network system 110 may also create a "played" edge 206E between the subject nodes 204 corresponding to the song "Freebird" and the Pandora App to indicate that the particular song was played by the particular application. Although the edges 206 described herein represent a single relationship, any one or more of the edges 206 of the social graph 200 can represent multiple relationships. For example, an edge 206F between the user node 202 corresponding to user E and the subject node 204 corresponding to the Pandora App may indicate that user E not only uses the Pandora App but also likes the Pandora App.

In some instances, a subject node 204 may correspond to a location or place, a website, an entity, content, an activity, an ideology, a belief, or an attribute, among other examples. For example, the location may correspond to a city, restaurant, park, or landmark, among other examples; the entity may correspond to a person, business, group, or sports team, among other examples; and the content may correspond to a photo, video file, document, movie, game, song, or application, among other examples. In other instances, a subject node 204 may represent content provided by a third-party system or application. For example, the content may be a webpage or resource hosted by the third-party system or application.

As discussed above, once a user is registered with a social network, the user may invite other users of the social network to establish connections with the respective user. In conventional systems, a user can typically send connection invites to other users simply by searching for other users or by selecting a "recommended" user connection that appears in the feed, wall, or home page of the respective user. In some instances, the invitee user may not know or may have never heard of the inviter, and therefore may not want to receive such connection invites. That is, although the ease with which new connections can be established may increase the interconnections between users, and thereby increase the number of unique social interactions by the users, some users may prefer to receive connection invites only from people or entities that they know or at least recognize.

Indeed, the amount of daily or weekly time that a user can spend sorting through a plurality of unsolicited connection invites from other users unknown to or unheard of by the respective user is not only unproductive but also tends to increase as more and more users are added to the social network. Specifically, if a second user does not know or recognize a first user, the second user may prefer to not receive connection invites from the first user, for example, so that the second user does not have to decline or ignore connection invites sent by the first user.

Thus, in accordance with various aspects of the present disclosure, the social network system 110 can restrict access in the social network 120 in a manner that reduces or even eliminates the ability of a user to send connection invites to other users with whom the respective user does not know, does not have a relationship, and/or does not share any profile information or personal attributes. In some implementations, the invitation manager 118 can restrict the ability of a user of the social network 120 to send connection invites to other users whom the respective user does not know. In some instances, the invitation manager 118 may allow a first user to send a connection invite to the second user only if the first user knows the second user. In other instances, the invitation manager 118 may allow the first user to send a connection invite to the second user only if the first user has some relationship or association with the second user. In some other instances, the invitation manager 118 may allow the first user to send a connection invite to the second user only if the first and second users have at least a specified number of personal attributes in common with each other. In other implementations, the invitation manager 118 can use some other criteria to determine whether or not to allow the first user to send a connection invite to the second user.

In various implementations, the invitation manager 118 may require the first user to provide information about the second user to ensure that the first user knows or has a personal relationship with the second user. In some instances, the invitation manager 118 may determine that the first user knows the second user if the first user can correctly answer at least a specified number or percentage of questions about the second user, in which case the invitation manager 118 forwards the connection invite to the second user. If the first user cannot correctly answer at least the specified number or percentage of questions, then the invitation manager 118 does not forward the connection invite to the second user, thereby preventing the first user from sending a connection invite to the second user.

In other instances, the invitation manager 118 may allow the first user to send a connection invite to the second user if the first user has some other relationship or association with the second user. In some other instances, the invitation manager 118 may allow the first user to send a connection invite to the second user if the first and second users have a certain number of personal attributes in common with each other. In other implementations, the invitation manager 118 can use some other criteria to determine whether or not to allow the first user to send a connection invite to the second user. In some aspects, the second user may select the criteria and/or questions used by the invitation manager 118 when determining whether or not to forward the connection invite from the first user to the second user. In other aspects, the invitation manager 118 may select the criteria and/or the questions.

Figure 3:
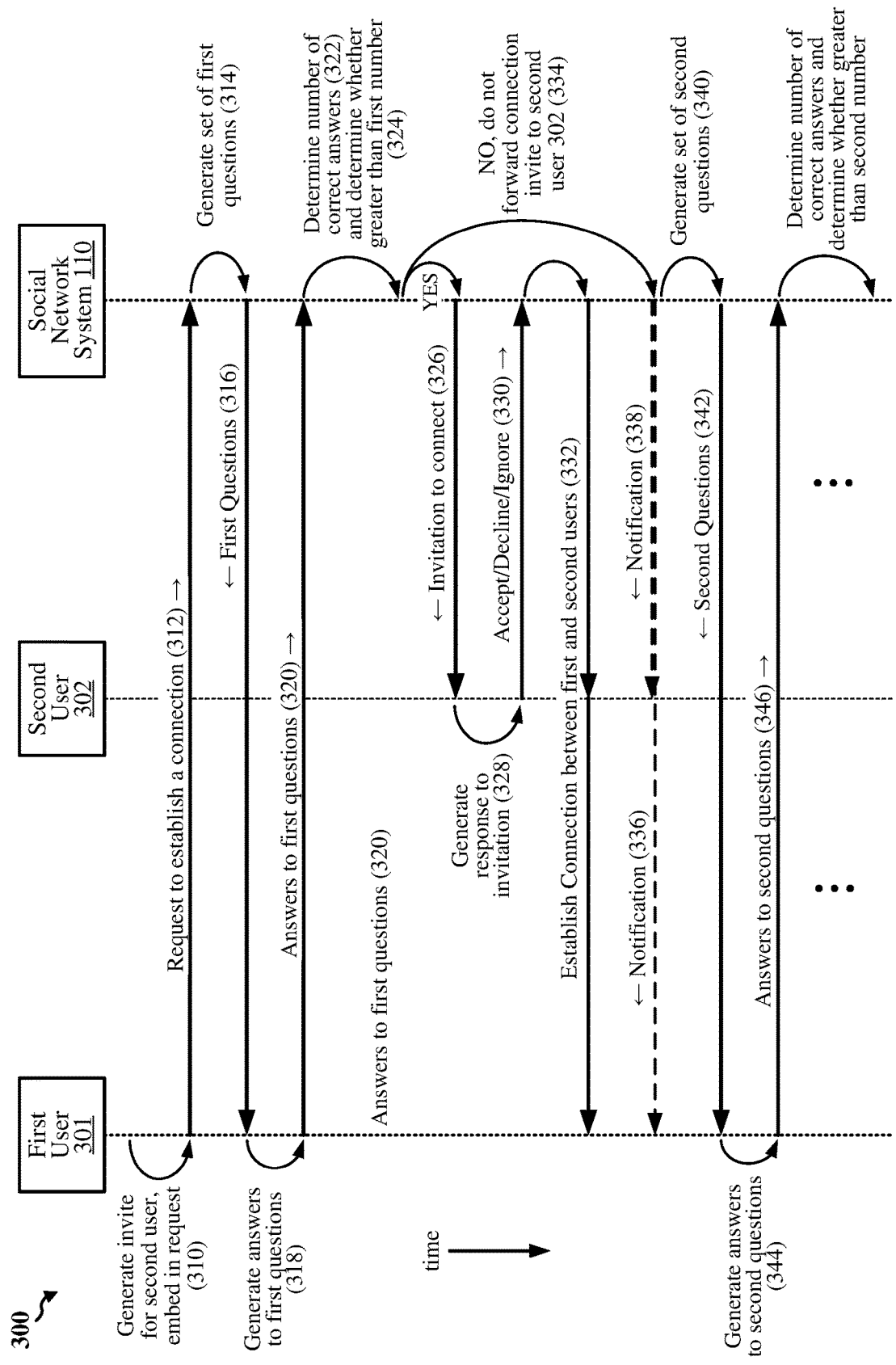
FIG. 3 shows a sequence diagram depicting operations facilitated by the social network of FIG. 1, according to some implementations.

FIG. 3 shows a sequence diagram depicting an example operation 300 for selectively forwarding a connection invite from a first user 301 of the social network 120 to a second user 302 of a social network system 110, according to some implementations. The first user 301 may be associated with computing device 101 of FIG. 1, and the second user 302 may be associated with computing device 102 of FIG. 1. That is, the first user 301 can access, transmit information to, and receive information from the social network system 110 using computing device 101 via the communications network 130, and the second user 302 can access, transmit information to, and receive information from the social network system 110 using computing device 102 via the communications network 130. As discussed, a respective user can use the browser, an App, or some other mechanism operating on the corresponding computing device to interact with the social network system 110 over the communications network 130. In various aspects, each of the computing devices 101-103 of FIG. 1 includes a user interface through which a respective user can access the social network system 110 and interact with users, posts, content, advertisements, job listings, services, and other resources available on the social network 120. The user interface may include at least one of a display screen, an audio interface, a virtual reality headset, an augmented reality headset, a digital assistant, a haptic interface, a motion-detection interface, a sensor interface, a keyboard, a trackpad, a trackball, or a mouse.

Prior to the example operations 300 of FIG. 3, the social network system 110 may store profile information for users of the social network 120 in the profile data store 116A of the database 116. The profile information for a respective user may include one or more of educational history of the respective user, an alma mater of the respective user, work history of the respective user, current or former employers of the respective user, current or former friends of the respective user, a spouse of the respective user, one or more children of the respective user, a current residence of the respective user, the city in which the respective user was born, a hometown of the respective user, a favorite sport of the respective user, a hobby of the respective user, a special talent of the respective user, or one or more characteristics, personal attributes, or facts pertaining to the respective user that are uniquely known to one or more other users.

In various implementations, the first user 301 generates a connection invite seeking to establish a connection with the second user 302 and embeds the connection invite within a request to establish a connection 312 (310). The first user 301 transmits the request including the connection invite over the communications network 130 to the social network system 110 (312). The request is routed to the invitation manager 118, which parses the request and determines that the first user 301 is requesting to send a connection invite to the second user 302.

The invitation manager 118 generates a number (Q) of questions to be transmitted to the first user 301 during a user verification procedure (314). The questions can be any suitable questions that can be used to determine whether or not the first user 301 knows the second user 302, would at least recognize the second user 302, or shares a certain number of personal attributes with the second user 302. In some instances, the invitation manager 118 may use the stored profile information of the second user 302 to generate the questions. In some aspects, the invitation manager 118 may also access or retrieve other information, either stored in the database 116 or provided by a third-party (not shown for simplicity), to generate the questions. In other instances, the second user 302 can provide some or all of the questions to the social network system 110. For example, the second user 302 may provide one or more sets of questions to the social network system 110 as part of joining or registering with the social network 110. For another example, the second user 302 may provide one or more sets of questions to the social network system 110 when configuring or updating his or her privacy settings.

The invitation manager 118 may use transmission resources of the social network system 110 to send the questions over the communications network 130 to the computing device 101 associated with the first user 301 (316). The computing device 101 presents the received questions on a display screen (or other suitable user interface) of the computing device 101, and prompts the first user 301 to provide answers to each of the questions presented by the computing device 101. An example presentation of the questions on the display screen of computing device 101 is described in more detail below with respect to FIG. 4A.

The first user 301 generates answers to the presented questions (318), and may use the computing device 101 to transmit the answers over the communications network 130 to the social network system 110 for analysis by the invitation manager 118 (320). An example of the first user providing the answers to the computing device 101 via a display screen is described in more detail below with respect to FIG. 4B.

The invitation manager 118 receives the answers provided by the first user 301, and determines whether each of the answers is correct based on at least the stored profile information of the second user 302 (322). As discussed, the invitation manager 118 may also access or retrieve other information, either stored in the database 116 or provided by a third-party (not shown for simplicity), to determine whether the answers provided by the first user 301 are correct. The invitation manager 118 then determines whether the number of correct answers is greater than a first number (324). For example, in some instances, the invitation manager 118 may access the second user's profile information stored in the database 116, and retrieve information pertaining to the questions presented to the first user 301. The invitation manager 118 can compare the retrieved profile information of the second user 302 with the answers submitted by the first user 301 to determine whether or not each of the answers submitted by the first user 301.

If the number of correct answers is greater than or equal to the first threshold number, the invitation manager 118 forwards the connection invite to the second user 302 (326). In some instances, the invitation manager 118 may send a notification to the first user 301 indicating that the connection invite was forwarded to the second user 302. An example presentation of the notification on the display screen of computing device 101 is described in more detail below with respect to FIG. 4C.

The second user 302 receives the connection invite, and generates a response to the connection invite (328). In some instances, the second user 302 may either accept, decline, or ignore the connection invite. The second user 302 can use computing device 102 to transmit the invitation response over the communications network 130 to the social network system 110 (330). If the response indicates that the second user 302 accepts the connection invite, the invitation manager 118 establishes a connection between the first user 301 and the second user 302, and may also create a connection edge between the user nodes 202 associated with the first and second users 301 and 302 in the social graph stored in the social graph data store 116B of the database 116. In some implementations, the invitation manager 118 may grant the first user 301 a level of access to content posted on the social network 120 by the second user 302 after establishing the connection between the users 301 and 302.

In some instances, the level of access granted to the first user 301 may be based on the number of correct answers submitted by the first user 301 in response to the first set of questions. For example, when the first user 301 answers all of the questions correctly, the invitation manager 118 may grant the first user 301 full access to posts, messages, and other content published on the social network 120 by the second user 302. For another example, when the first user 301 provides the minimum number of correct answers for the invitation manager 118 to forward the connection invite to the second user 302, the invitation manager 118 may grant the first user 301 a limited or restricted access to the posts, messages, and other content published on the social network 120 by the second user 302.

If the second user 302 declines the connection invite, the invitation manager 118 transmits to the first user 301 over the communications network 130, a notification indicating that the connection invite was declined by the second user 302. Otherwise, if the second user 302 ignores the connection invite (whether by not interacting with the connection invite at all or by interacting with an "ignore" icon or selection associated with the connection invite), then the invitation manager 118 may take no further action associated with the requested connection invite.

The first threshold number may be any suitable number that is less than or equal to the number of questions presented to the first user 301. For example, when the first threshold number ($N_{TH}$)=3 and the invitation manager 118 presents Q=3 questions to the first user 301, the invitation manager 118 forwards the connection invite to the second user 302 via computing device 102 only if the first user 301 answers all 3 questions correctly. For another example, when $N_{TH}$=2 and the invitation manager 118 presents Q=3 questions to the first user 301, the invitation manager 118 forwards the connection invite to the second user 302 via computing device 102 if the first user 301 answers 2 or more questions correctly.

Conversely, if the number of correct answers is less than the first threshold number, the invitation manager 118 does not forward the connection invite to the second user 302 (334). In some instances, the invitation manager 118 may send a notification to the first user 301 indicating that the connection invite was not forwarded to the second user 302 (336). An example of the invitation manager 118 notifying the first user 301 that the connection invite was not forwarded to the second user 302 due to an insufficient number of correct answers is described in more detail below with respect to FIG. 4D.

In some instances, the invitation manager 118 may also send a notification to the second user 302 indicating that the first user 301 attempted to send a connection invite to the second user 302 (338). In other instances, the second user 302 may indicate, to the social network system 110, a preference as to whether or not the second user 302 wants to receive such notifications. In some aspects, the second user's preference may be stored as part of the profile information of the second user 302. In this way, various aspects of the subject matter disclosed herein may better protect the privacy of the second user 302 by allowing only users of the social network 120 that can verify at least some knowledge of, or connection to, the second user 302 to actually connect with (or send a connection request to) the second user 302.

In some implementations, the invitation manager 118 may allow the first user 301 another opportunity to verify a relationship or connection with the second user 302. For example, after notifying the first user 301 that the connection invite was not sent to the second user 302 (due to the number of correct answers being below the first threshold), the invitation manager 118 may present, on the display screen of computing device 101, an icon that when selected causes the invitation manager 118 to send a second set of questions to the first user 301. Specifically, the invitation manager 118 generates a second set of questions (340), and transmits the second set of questions over the communications network 130 to the first user 301 via computing device 101 (342).

The computing device 101 receives the second questions, presents the second questions on the display screen of the computing device 101, and prompts the first user 301 to enter answers to the second questions provided by the social network system 110. An example presentation of the second questions on the display screen of computing device 101 is described in more detail below with respect to FIG. 4E.

The first user 301 generates answers to the second questions (344), and then uses the computing device 101 to transmit the answers over the communications network 130 to the social network system 110 (346). An example of the first user providing the answers on the computing device 101 via the display screen of computing device 101 is described in more detail below with respect to FIG. 4F.

The invitation manager 118 determines whether each of the second answers provided by the first user 301 is correct based on the stored profile information of the second user 302, and determines whether the number of correct answers exceeds a second threshold number. As discussed, the invitation manager 118 can compare profile information of the second user 302 with the answers submitted by the first user 301 to determine whether or not each of the answers submitted by the second user 302 is correct. If the number of correct answers is greater than or equal to the second threshold number, the invitation manager 118 forwards the connection invite to the second user 302. In some instances, the invitation manager 118 may send a notification to the first user 301 indicating that the connection invite was forwarded to the second user 302.

The second threshold number may be any suitable number that is less than or equal to the number of second questions presented to the first user 301. For example, when the second threshold number ($N_{TH}$)=3 and the invitation manager 118 presents Q=3 questions to the first user 301, the invitation manager 118 forwards the connection invite to the second user 302 via computing device 102 only if the first user 301 answers all 3 questions correctly. For another example, when $N_{TH}$=4 and the invitation manager 118 presents Q=5 questions to the first user 301, the invitation manager 118 forwards the connection invite to the second user 302 via computing device 102 if the first user 301 answers at least 4 of the 5 questions correctly.

The second user 302 receives the connection invite, and generates a response to the connection invite (328). In some instances, the second user 302 may either accept, decline, or ignore the connection invite. The second user 302 can use computing device 102 to transmit the invitation response over the communications network 130 to the social network system 110 (330). If the second user 302 accepts the connection invite, the invitation manager 118 establishes a connection between the first user 301 and the second user 302 (332), and may also create a connection edge between the user nodes 202 associated with the first and second users 301 and 302 in the social graph stored in the social graph data store 116B of the database 116. In some implementations, the invitation manager 118 may grant the first user 301 a level of access to content posted on the social network 120 by the second user 302 after establishing the connection between the two users 301 and 302. In some instances, the level of access granted to the first user 301 may be based on the number of correct answers submitted by the first user 301 in response to the first set of questions.

If the second user 302 declines the connection invite, the invitation manager 118 may transmit a notification to the first user 301 indicating that the connection invite was declined by the second user 302. Otherwise, if the second user 302 ignores the connection invite, the invitation manager 118 may take no further action associated with the requested connection invite.

The second threshold number may be any suitable number that is less than or equal to the number of second questions presented to the first user 301. For example, when the second threshold number ($N_{TH}$)=4 and the invitation manager 118 presents Q=4 questions to the first user 301, the invitation manager 118 forwards the connection invite to the second user 302 via computing device 102 only if the first user 301 answers all 4 questions correctly. For another example, when $N_{TH}$=2 and the invitation manager 118 presents Q=4 questions to the first user 301, the invitation manager 118 forwards the connection invite to the second user 302 via computing device 102 if the first user 301 answers 2 or more questions correctly.

Conversely, if the number of correct answers is less than the second threshold number, the invitation manager 118 does not forward the connection invite to the second user 302. As discussed, the invitation manager 118 may send a notification to the first user 301 indicating that the connection invite was not forwarded to the second user 302 and/or may send a notification to the second user 302 indicating that the first user 301 attempted to send a connection invite to the second user 302. For instances in which the second user 302 has indicated a preference to not receive such notifications, the social network system 110 will not transmit the notification to the second user 302. In this way, the invitation manager 118 can selectively restrict the ability of users, organizations, and other entities associated with the social network 120 to send unsolicited invitations to other users. As discussed, in some aspects, the second user 302 may select the criteria and/or questions used by the invitation manager 118 to verify that the first user 301 knows the second user 302.

Although the example operation of FIG. 3 provides two rounds of questions to the first user 301, in other implementations, the social network system 110 may provide other numbers of rounds of questions to the first user 301. For example, in some aspects, the social network system 110 may provide three or more rounds of questions to the first user 301 with each round having the same or different associated threshold numbers. In other aspects, the social network system 110 may provide only one round of questions to the first user 301.

In some other implementations, the invitation manager 118 may determine whether the request to connect with the second user 302 corresponds to a prior search by the first user 301 for users of the social network 120 that have one or more personal attributes specified by the second user 302. The invitation manager 118 may determine that the first user 301 has at least one of the personal attributes specified by the second user 302 and that the second user 302 has indicated a willingness to accept invitations from other users who have the at least one personal attribute. When the first and second users 301 and 302 have the same at least one personal attribute in common with each other, the invitation manager 118 may transmit, over the communications network 130 to the second computing device 102 associated with the second user 302, the invitation to establish the connection with the first user 301.

Figure 4B:
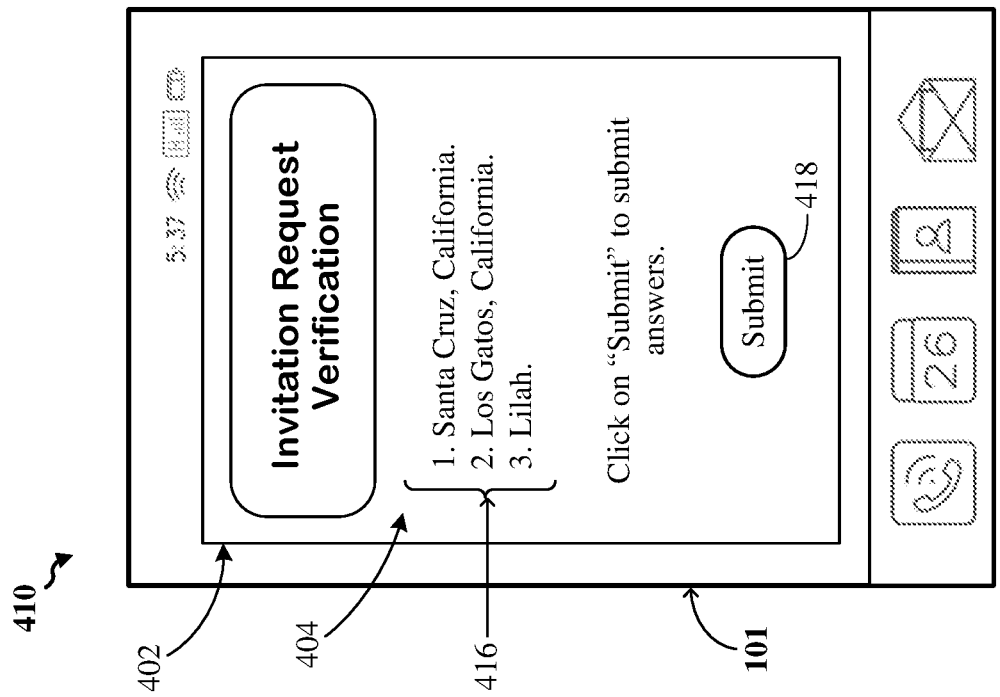
FIGS. 4A-4F show example screenshots of a user's communication device during an example operation to establish a connection with another user of the social network, according to some implementations.
Figure 4A:
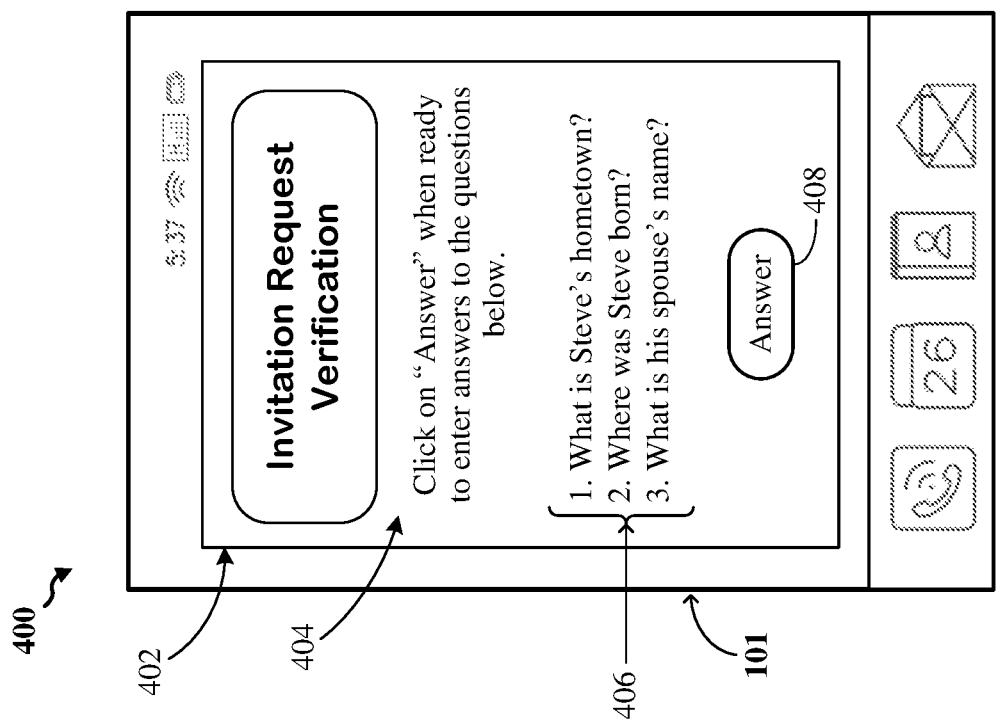

FIG. 4A shows an example screenshot 400 of a display screen 402 of computing device 101, according to some implementations. As discussed, the computing device 101 is associated with the first user 301 described with respect to the operations 300 of FIG. 3. The display screen 402 may include or implement a user interface 404 of a browser or social network App that presents the first set of questions 406 to the first user 301. In the example screenshot 400, three questions 406 received from the social network system 120 are presented on the user interface 404 of the display screen 402. The three questions 406, which may be received from the social network system 110 in response to a request from the first user 301 to send a connection invite to a second user 302, are (1) what is Steve's hometown? (2) where was Steve born? and (3) what is his spouse's name? In the examples of FIGS. 4A-4F, the second user's name is Steve. When the first user 301 is ready to provide answers to the three questions 406, the first user 301 may touch, tap, click on, or otherwise interact with the "Answer" icon 408.

FIG. 4B shows another example screenshot 410 of the display screen 402 of the computing device 101, according to some implementations. In the example screenshot 410, the first user 301 uses the user interface 404 presented on the display screen 402 to enter three answers 416 responsive to the three questions 406 presented on the user interface 404 of FIG. 4A. As shown, the three answers 416 are (1) Santa Cruz, California, (2) Los Gatos, California, and (3) Lilah. When the first user 301 is ready to submit the three answers 416, the first user 301 may touch, tap, click on, or otherwise interact with the "Submit" icon 418. In response thereto, the computing device 101 transmits the three answers 416 to the social network system 110 over the communications network 130.

Figure 4D:
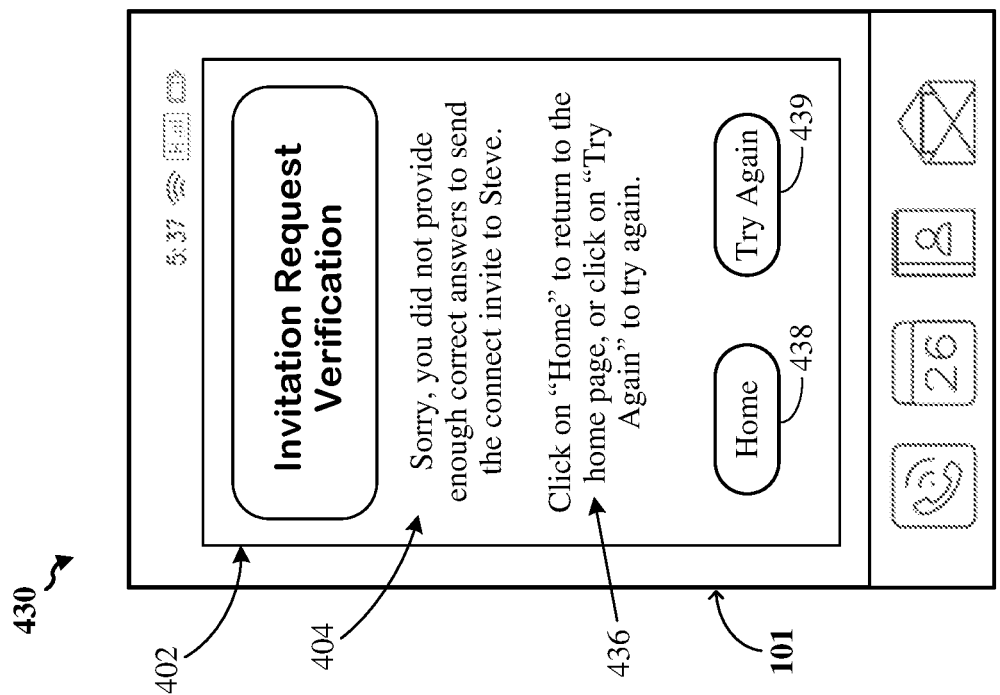
Figure 4C:
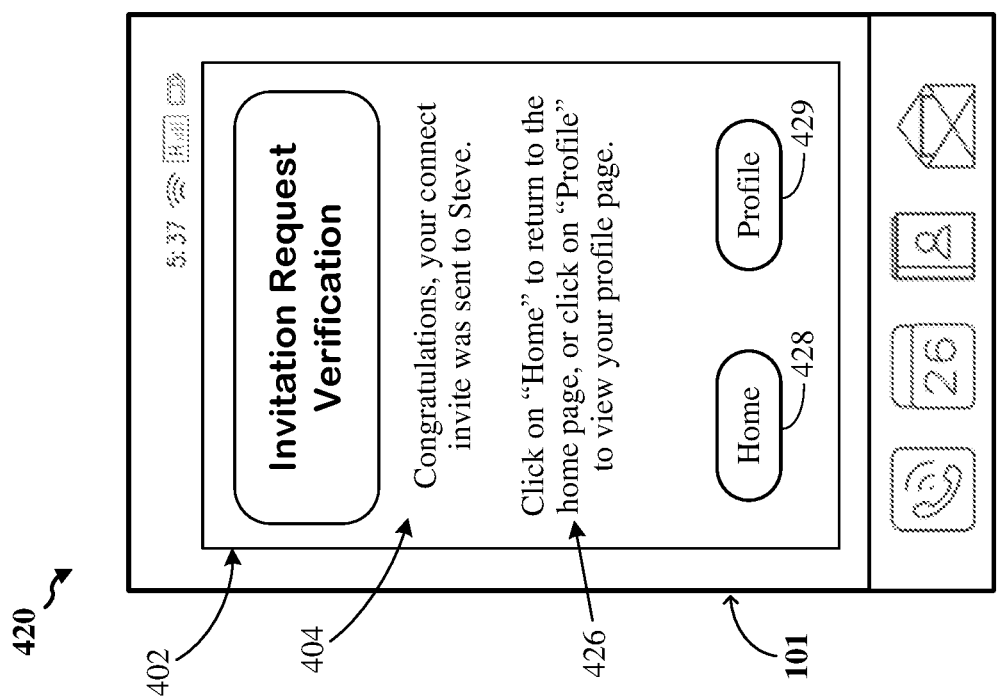

FIG. 4C shows another example screenshot 420 of the display screen 402 of computing device 101, according to some implementations. As shown, the computing device 101 presents, on the user interface 404 of the display screen 402, a notification 426 that the connection invite was sent to the second user 302. In the example of FIG. 4C, the first user 301 can return to the homepage of the social network 120 by touching, tapping, clicking, or otherwise interacting with the "Home" icon 428, or can return to their own profile page by touching, tapping, clicking, or otherwise interacting with the "Profile" icon 429.

FIG. 4D shows another example screenshot 430 of the display screen 402 of computing device 101, according to some implementations. As shown, the computing device 101 presents, on the user interface 404 of the display screen 402, a notification 436 that the connection invite was not sent to the second user 302 because the first user 301 did not answer a sufficient number of questions correctly (i.e., the number of correct answers provided by the first user 301 is less than the first threshold number). In the example of FIG. 4D, the first user 301 can return to the homepage of the social network 120 by touching, tapping, clicking, or otherwise interacting with the "Home" icon 438, or can try again to verify that the first user 301 knows or has a relationship with the second user 302 by touching, tapping, clicking, or otherwise interacting with the "Try Again" icon 439.

Figure 4F:
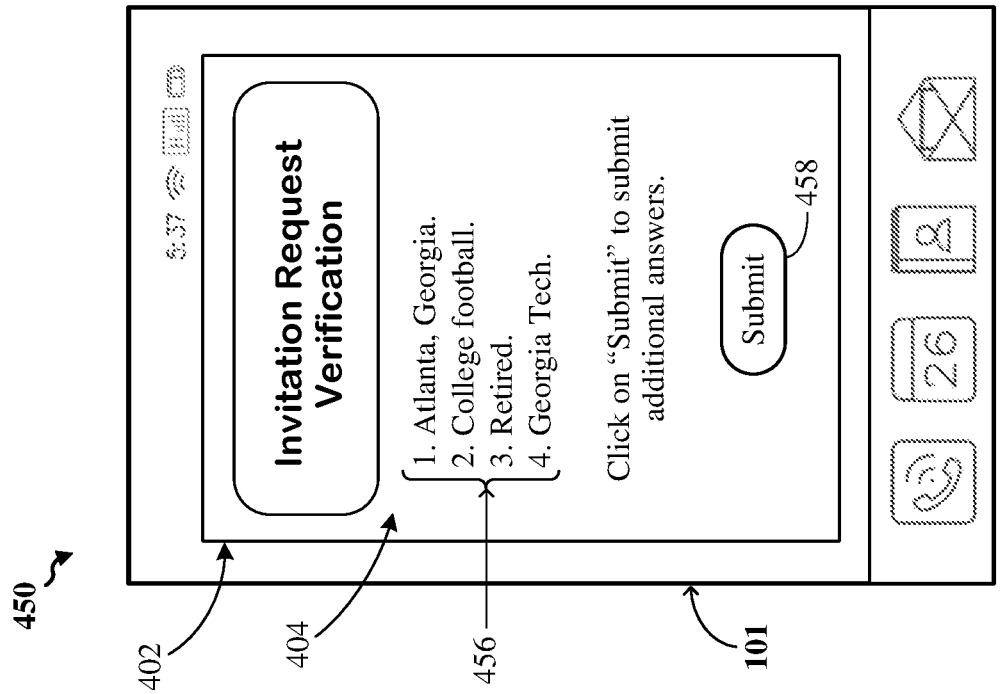
Figure 4E:
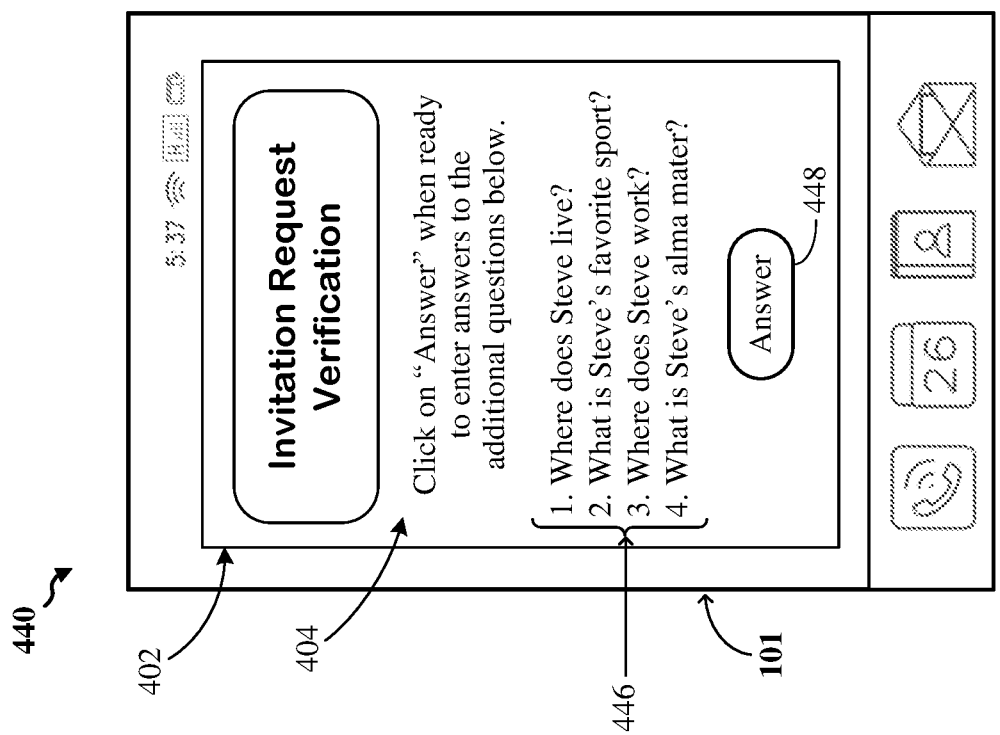

FIG. 4E shows another example screenshot 440 of the display screen 402 of computing device 101, according to some implementations. As shown, four additional questions 446 received as a second set of questions from the social network system 110 are presented on the user interface 404 of computing device 101. The four additional questions 446 are received from the social network system 110 in response to the first user 301 interacting with the "Try Again" icon 439 shown in the screenshot 430 of FIG. 4D. In the example of FIG. 4E, the four additional questions 446 are (1) Where does Steve live? (2) What is Steve's favorite sport?(3) Where does Steve work? and (4) What is Steve's alma mater? The first user 301 may touch, tap, click on, or otherwise interact with the "Answer" icon 448 when ready to provide answers to the four additional questions 446.

FIG. 4F shows another example screenshot 450 of the display screen 402 of computing device 101, according to some implementations. In the example screenshot 450, the first user 301 uses the user interface 404 presented on the display screen 402 to enter four answers 456 responsive to the four additional questions 446 presented on the user interface 404 in FIG. 4E. As shown, the four answers 456 are (1) Atlanta, Georgia, (2) College football, (3) retired, and (4) Georgia Tech. When the first user 301 is ready to submit the four answers 456, the first user 301 may touch, tap, click on, or otherwise interact with the "Submit" icon 458. In response thereto, the computing device 101 transmits the four answers 456 to the social network system 110 over the communications network 130.

Referring again to FIG. 1, in some other implementations, the social network system 110 may include a machine learning model 122 that can employ one or more machine learning algorithms based on decision trees, random forests, logistic regression, nearest neighbors, classification trees, control flow graphs, support vector machines, naïve Bayes, Bayesian Networks, value sets, hidden Markov models, neural networks, or any combination thereof that can be configured to generate questions used for determining whether or not an inviter user knows an invitee user, would likely recognize the invitee user, or at least shares one or more personal attributes with the invitee user. The machine learning model 122 can include any suitable number of machine learning engines, and can take the form of an extensible data structure that represents sets of attributes, features, or characteristics of the vendors and consumer. In some implementations, the machine learning model 122 generates the questions by applying one or more similarity or correlation rules to the respective profile information or personal attributes of the invitee user and the inviter user. For example, in some instances, the profile information (or personal attributes) of the invitee user and the profile information (or personal attributes) of the inviter user may be aggregated together to form a structured data set that can be provided as input data to the machine learning model 122. Then, the machine learning model 122 can apply one or more similarity or correlation rules to the structured data set to identify one or more aspects of the profile information (or personal attributes) common to both the invitee user and the inviter user.

In some instances, the machine learning model 122 may be a recurrent neural network (RNN). Although not shown for simplicity, the RNN uses an influence of prior information to determine the risks associated with transactions based on current information. For example, instead of a purely feed forward neural network, an RNN may include a feedback loop between nodes or layers or other means for prior outputs of a node or layer to impact a current output of a node or layer. In some aspects, the RNN is an artificial neural network including a plurality of nodes configured for obtaining prior outputs of nodes and connected to form a directed graph along a temporal sequence.

Figure 5:
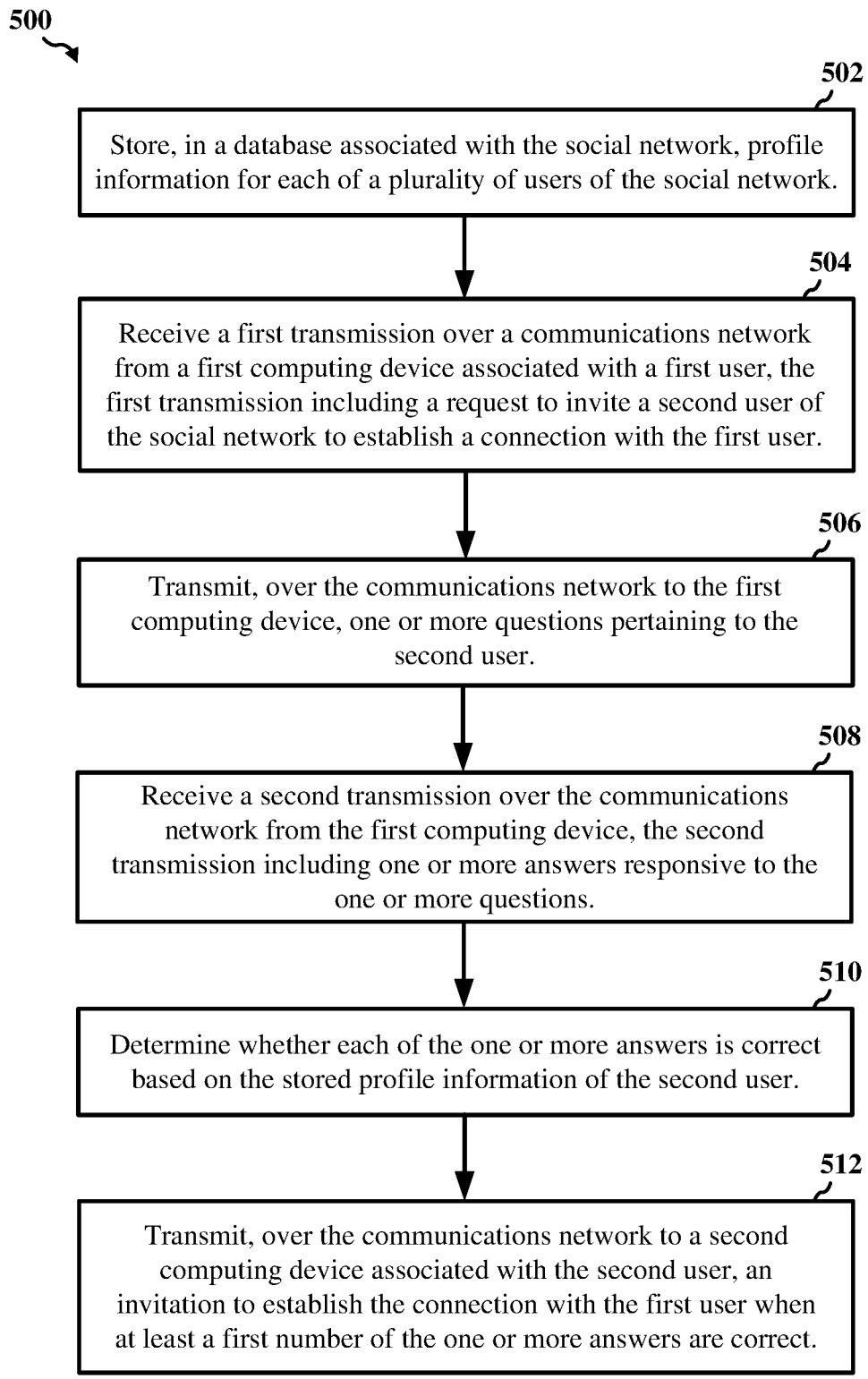
FIGS. 5-10 show illustrative flowcharts depicting example operations for restricting access to a social network, according to some implementations.

FIG. 5 shows an illustrative flowchart depicting an example operation 500 for restricting access in a social network, according to some implementations. In some instances, the social network may be hosted by a server accessible over a communications network. The operation 500 may be performed by one or more processors associated with the social network system 110 of FIG. 1. At 502, the social network system 110 stores profile information for each of a plurality of users of the social network in a database associated with the social network. At 504, the social network system 110 receives a first transmission over the communications network from a first computing device associated with a first user, the first transmission including a request to invite a second user of the social network to establish a connection with the first user. At 506, the social network system 110 transmits, over the communications network to the first computing device, one or more questions pertaining to the second user. At 508, the social network system 110 receives a second transmission over the communications network from the first computing device, the second transmission including one or more answers responsive to the one or more questions. At 510, the social network system 110 determines whether each of the one or more answers is correct based on the stored profile information of the second user. At 512, the social network system 110 transmits, over the communications network to a second computing device associated with the second user, an invitation to establish the connection with the first user when at least a first number of the one or more answers are correct. In some aspects, the social network system 110 transmits the invitation to establish the connection to the second computing device only if all the answers to the one or more questions are correct.

In some implementations, the profile information may include includes one or more of educational history of the second user, an alma mater of the second user, work history of the second user, current or former employers of the second user, current or former friends of the second user, a spouse of the second user, one or more children of the second user, a current residence of the second user, the city in which the second user was born, a hometown of the second user, a favorite sport of the second user, a hobby of the second user, a special talent of the second user, or one or more characteristics, attributes, or facts pertaining to the second user that are uniquely known to the first user.

Figure 6:
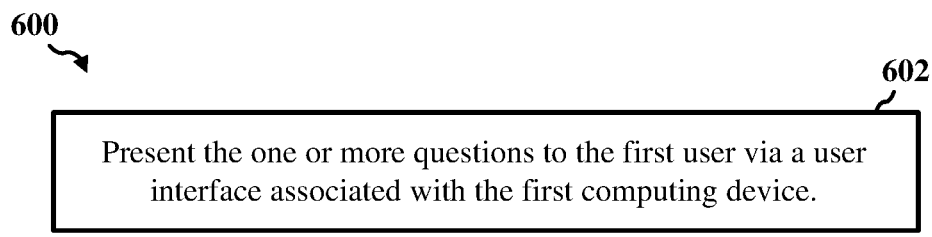

FIG. 6 shows an illustrative flowchart depicting an example operation 600 for restricting access in a social network, according to some implementations. The operation 600 may be performed by one or more processors associated with the social network system 110 of FIG. 1. In some instances, the operation 600 may be performed after transmitting the one or more questions to the first computing device at 506 of FIG. 5. For example, at 602, the social network system 110 presents the one or more questions to the first user via a user interface associated with the first computing device. In some aspects, the user interface includes at least one of a display screen, an audio interface, a virtual reality headset, an augmented reality headset, a digital assistant, a haptic interface, a motion-detection interface, a sensor interface, a keyboard, a trackpad, a trackball, or a mouse.

Figure 7:
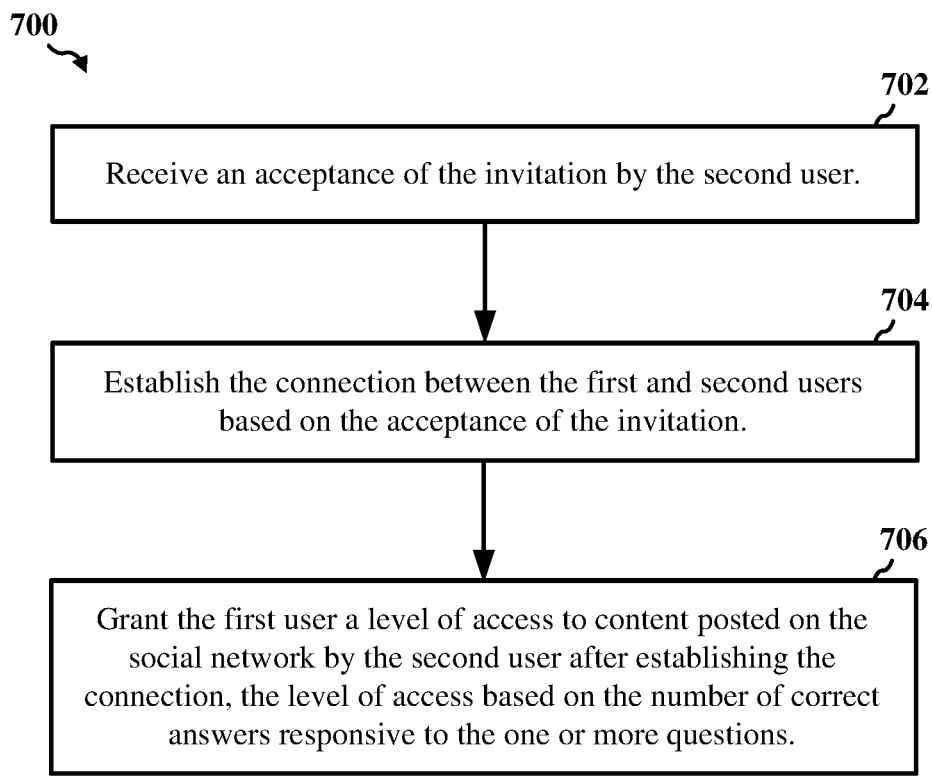

FIG. 7 shows an illustrative flowchart depicting an example operation 700 for restricting access in a social network, according to some other implementations. The operation 700 may be performed by one or more processors associated with the social network system 110 of FIG. 1. In some instances, the operation 700 may be performed after transmitting the one or more questions to the first computing device at 506 of FIG. 5. For example, at 702, the social network system 110 receives an acceptance of the invitation by the second user. At 704, the social network system 110 establishes the connection between the first and second users based on the acceptance of the invitation by the second user. At 706, the social network system 110 grants the first user a level of access to content posted on the social network by the second user after establishing the social connection. In some aspects, the level of access may be based on the number of correct answers responsive to the one or more questions.

In some instances, the second user employs the second computing device to transmit the acceptance of the invitation over the communications network to the social network. In some aspects, the social network establishes the connection between the first and second users by adding a connection edge between user nodes associated with the first and second users in a social graph stored in the database. In some aspects, the social network may also transmit an indication of the established connection to each of the first and second computing devices associated with the respective first and second users.

Figure 8:
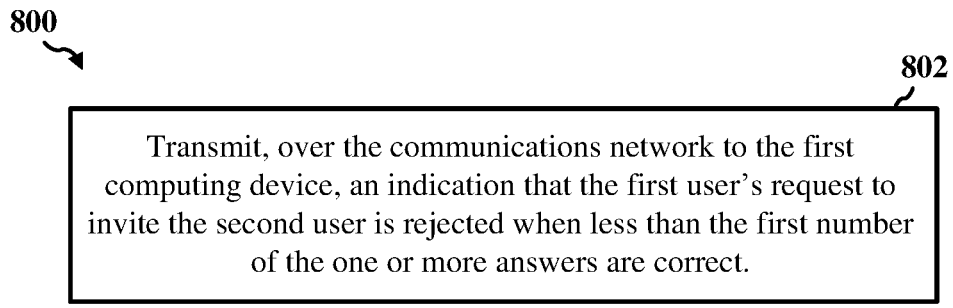

FIG. 8 shows an illustrative flowchart depicting an example operation 800 for restricting access in a social network, according to some other implementations. The operation 800 may be performed by one or more processors associated with the social network system 110 of FIG. 1. In some instances, the operation 800 may be performed in conjunction with the example operation 500 of FIG. 5. For example, at 802, the social network system 110 transmits, over the communications network to the first computing device, an indication that the first user's request to invite the second user is rejected when less than the first number of the one or more answers are correct. In various aspects, the indication may inform the first user that an insufficient number of correct answers were submitted in response to the one or more questions. In some instances, the social network may allow the first user to answer additional questions about the first user, for example, to again try to have the connection invite sent to the second user.

Figure 9:
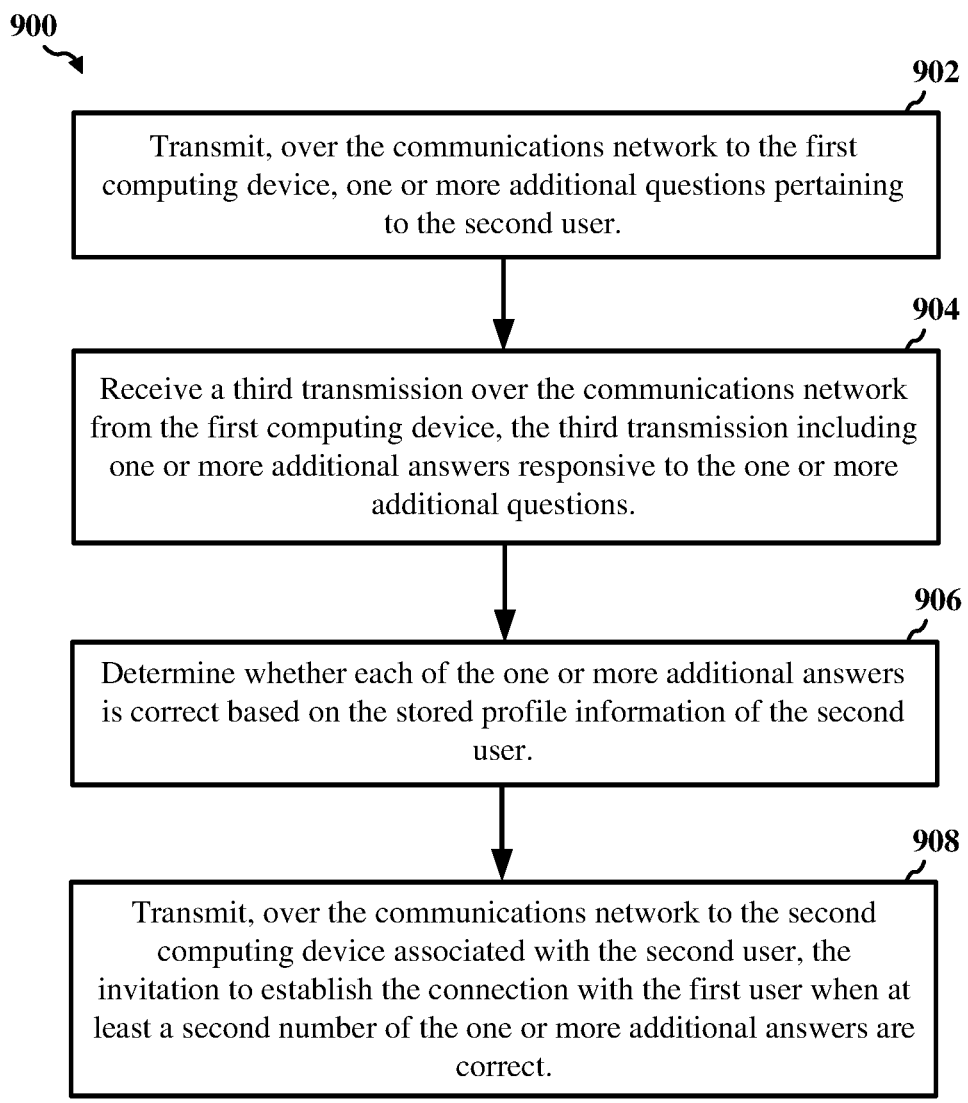

FIG. 9 shows an illustrative flowchart depicting an example operation 900 for restricting access in a social network, according to some other implementations. The operation 900 may be performed by one or more processors associated with the social network system 110 of FIG. 1. In some instances, the operation 900 may be performed after less than the first number of the one or more answers are determined to be correct at 510 of FIG. 5. For example, at 902, the social network system 110 transmits, over the communications network to the first computing device, one or more additional questions pertaining to the second user. At 904, the social network system 110 receives a third transmission over the communications network from the first computing device, the third transmission including one or more additional answers responsive to the one or more additional questions. At 906, the social network system 110 determines whether each of the one or more additional answers is correct based on the stored profile information of the second user. At 810, the social network system 110 transmits, over the communications network to the second computing device associated with the second user, the invitation to establish the connection with the first user when at least a second number of the one or more additional answers are correct. In some instances, the second number may be greater than the first number. In other instances, the second number may be less than the first number. In some other instances, the second number may be equal to the first number.

Figure 10:
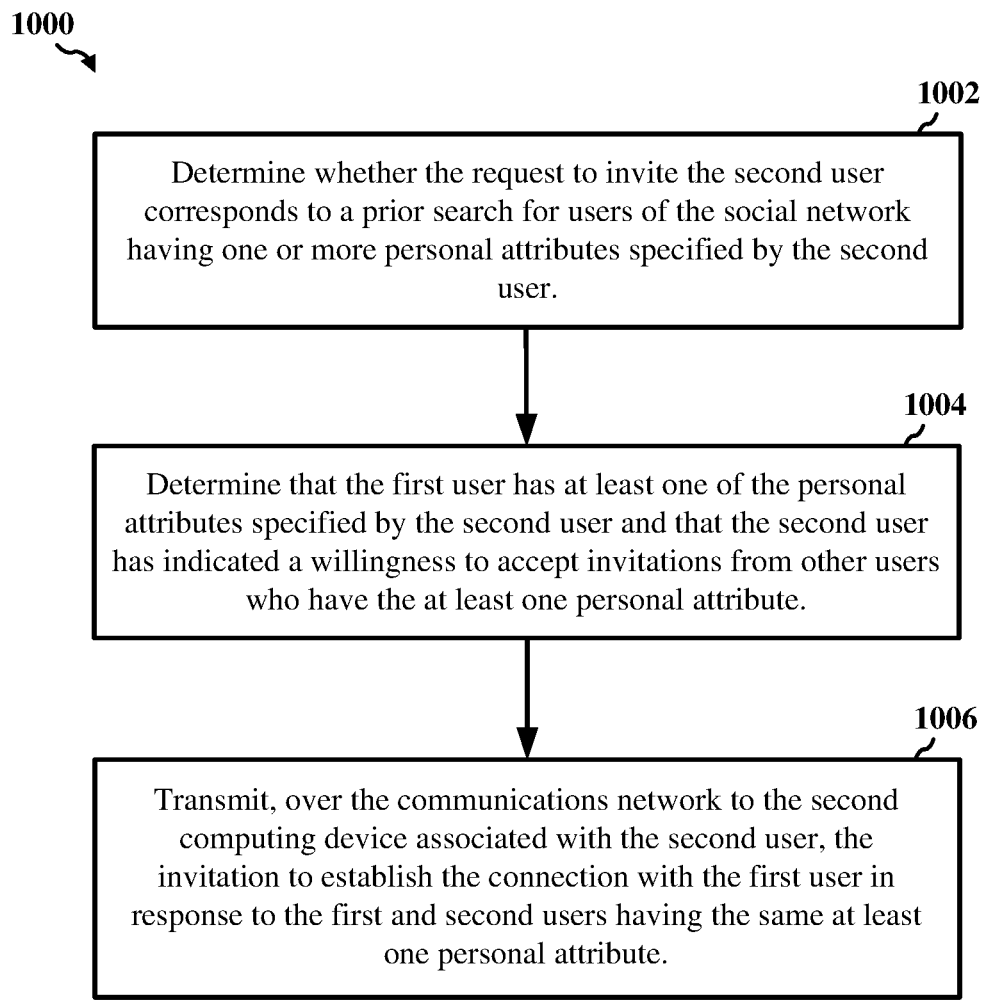

FIG. 10 shows an illustrative flowchart depicting an example operation 1000 for restricting access in a social network, according to some implementations. The operation 1000 may be performed by one or more processors associated with the social network system 110 of FIG. 1. In some instances, the operation 1000 may be performed in conjunction with the example operation 500 of FIG. 5. For example, at 1002, the social network system 110 determines whether the request to invite the second user corresponds to a prior search for users of the social network having one or more personal attributes specified by the second user. At 1004, the social network system 110 determines that the first user has at least one of the personal attributes specified by the second user and that the second user has indicated a willingness to accept invitations from other users who have the at least one personal attribute. At 1006, the social network system 110 transmits, over the communications network to the second computing device associated with the second user, the invitation to establish the connection with the first user in response to the first and second users having the same at least one personal attribute.

As used herein, a phrase referring to "at least one of" a list of items refers to any combination of those items, including single users. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing,""multiplying," "averaging," "monitoring," "comparing," "applying," "updating," "measuring,""deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for restricting access in a social network, the method performed by one or more processors of a server hosting the social network and comprising:
   storing, in a database associated with the social network, profile information for each of a plurality of users of the social network;
   receiving a first transmission over a communications network from a first computing device associated with a first user, the first transmission including a request to invite a second user of the social network to establish a connection with the first user;
   transmitting, over the communications network to the first computing device, one or more questions pertaining to the second user;
   receiving a second transmission over the communications network from the first computing device, the second transmission including one or more answers responsive to the one or more questions;
   determining whether each of the one or more answers is correct based on the stored profile information of the second user; and
   transmitting, over the communications network to a second computing device associated with the second user, an invitation to establish the connection with the first user when at least a first number of the one or more answers are correct.

2. The method of claim 1, wherein the profile information includes one or more of educational history of the second user, an alma mater of the second user, work history of the second user, current or former employers of the second user, current or former friends of the second user, a spouse of the second user, one or more children of the second user, a current residence of the second user, the city in which the second user was born, a hometown of the second user, a favorite sport of the second user, a hobby of the second user, a special talent of the second user, or one or more characteristics, attributes, or facts pertaining to the second user that are uniquely known to the first user.

3. The method of claim 1, wherein the invitation to establish the connection is transmitted to the second computing device only if all the answers to the one or more questions are correct.

4. The method of claim 1, further comprising:
   presenting the one or more questions to the first user via a user interface associated with the first computing device.

5. The method of claim 4, wherein the user interface includes at least one of a display screen, an audio interface, a virtual reality headset, an augmented reality headset, a digital assistant, a haptic interface, a motion-detection interface, a sensor interface, a keyboard, a trackpad, a trackball, or a mouse.

6. The method of claim 1, further comprising:
   receiving an acceptance of the invitation by the second user; and
   establishing the social connection between the first and second users based on the acceptance of the invitation.

7. The method of claim 6, further comprising:
   granting the first user a level of access to content posted on the social network by the second user after establishing the connection, the level of access based on the number of correct answers responsive to the one or more questions.

8. The method of claim 1, further comprising:
   transmitting, over the communications network to the second computing device associated with the second user, an indication that the first user's request to invite the second user is rejected when less than the first number of the one or more answers are correct.

9. The method of claim 1, further comprising:
   transmitting, over the communications network to the first computing device, one or more additional questions pertaining to the second user when less than the first number of the one or more answers are correct;
   receiving a third transmission over the communications network from the first computing device, the third transmission including one or more additional answers responsive to the one or more additional questions;

determining whether each of the one or more additional answers is correct based on the stored profile information of the second user; and transmitting, over the communications network to the second computing device associated with the second user, the invitation to establish the connection with the first user when at least a second number of the one or more additional answers are correct.

10. The method of claim 9, wherein the second number is greater than the first number.

11. The method of claim 1, further comprising:

determining whether the request to invite the second user corresponds to a prior search for users of the social network having one or more personal attributes specified by the second user;

determining that the first user has at least one of the personal attributes specified by the second user and that the second user has indicated a willingness to accept invitations from other users who have the at least one personal attribute; and transmitting, over the communications network to the second computing device associated with the second user, the invitation to establish the connection with the first user in response to the first and second users having the same at least one personal attribute.

12. A system for restricting access in a social network, the system comprising:

one or more processors; and a memory communicatively coupled with the one or more processors and storing instructions that, when executed by the one or more processors, causes the system to:

store, in a database associated with the social network, profile information for each of a plurality of users of the social network;

receive a first transmission over the communications network from a first computing device associated with a first user, the first transmission including a request to invite a second user of the social network to establish a connection with the first user;

transmit, over the communications network to the first computing device, one or more questions pertaining to the second user;

receive a second transmission over the communications network from the first computing device, the second transmission including one or more answers responsive to the one or more questions;

determine whether each of the one or more answers is correct based on the stored profile information of the second user; and transmit, over the communications network to a second computing device associated with the second user, an invitation to establish the connection with the first user when at least a first number of the one or more answers are correct.

13. The system of claim 12, wherein the profile information includes one or more of educational history of the second user, an alma mater of the second user, work history of the second user, current or former employers of the second user, current or former friends of the second user, a spouse of the second user, one or more children of the second user, a current residence of the second user, the city in which the second user was born, a hometown of the second user, a favorite sport of the second user, a hobby of the second user, a special talent of the second user, or one or more characteristics, attributes, or facts pertaining to the second user that are uniquely known to the first user.

14. The system of claim 12, wherein the invitation to establish the connection is transmitted to the second computing device only if all the answers to the one or more questions are correct.

15. The system of claim 12, wherein execution of the instructions further causes the system to:

present the one or more questions to the first user via a user interface associated with the first computing device.

16. The system of claim 15, wherein the user interface includes at least one of a display screen, an audio interface, a virtual reality headset, an augmented reality headset, a digital assistant, a haptic interface, a motion-detection interface, a sensor interface, a keyboard, a trackpad, a trackball, or a mouse.

17. The system of claim 12, wherein execution of the instructions further causes the system to:

receive an acceptance of the invitation by the second user; and establish the connection between the first and second users based on the acceptance of the invitation.

18. The system of claim 17, wherein execution of the instructions further causes the system to:

grant the first user a level of access to content posted on the social network by the second user after establishing the social connection, the level of access based on the number of correct answers to the one or more questions.

19. The system of claim 12, wherein execution of the instructions further causes the system to:

transmitting, over the communications network to the second computing device associated with the second user, an indication that the first user's request to invite the second user is rejected when less than the first number of the one or more answers are correct.

20. The system of claim 12, wherein execution of the instructions further causes the system to:

transmit, over the communications network to the first computing device, one or more additional questions pertaining to the profile information of the second user when less than the first number of the one or more answers are correct;

receive a third transmission over the communications network from the first computing device, the third transmission including one or more additional answers responsive to the one or more additional questions;

determine whether each of the one or more additional answers is correct based on the stored profile information of the second user; and transmit, over the communications network to the second computing device associated with the second user, the invitation to establish the connection with the first user when at least a second number of the one or more additional answers are correct.

* * * * *